United States Patent
Mastrandrea et al.

(10) Patent No.: US 10,164,225 B2
(45) Date of Patent: Dec. 25, 2018

(54) BATTERY SYSTEM HOUSING WITH BUSBAR GRID FIXATION

(71) Applicant: Thunder Power New Energy Vehicle Development Company Limited, Central (HK)

(72) Inventors: Francesco Mastrandrea, Milan (IT); Peter Tutzer, Milan (IT)

(73) Assignee: Thunder Power New Energy Vehicle Development Company Limited, Central (HK)

(*) Notice: Subject to any disclaimer, the term of this patent is extended or adjusted under 35 U.S.C. 154(b) by 0 days.

(21) Appl. No.: 15/468,584

(22) Filed: Mar. 24, 2017

(65) Prior Publication Data

US 2018/0069211 A1    Mar. 8, 2018

Related U.S. Application Data

(60) Provisional application No. 62/384,298, filed on Sep. 7, 2016.

(51) Int. Cl.
| | |
|---|---|
| *H01M 6/46* | (2006.01) |
| *H01M 2/10* | (2006.01) |
| *H01M 2/20* | (2006.01) |
| *B60L 11/18* | (2006.01) |
| *H01M 10/625* | (2014.01) |
| *H01M 10/6557* | (2014.01) |
| *H01M 10/643* | (2014.01) |

(52) U.S. Cl.
CPC ....... *H01M 2/1077* (2013.01); *B60L 11/1879* (2013.01); *H01M 2/206* (2013.01); *H01M 10/625* (2015.04); *H01M 10/643* (2015.04); *H01M 10/6557* (2015.04); *H01M 2220/20* (2013.01)

(58) Field of Classification Search
CPC .. H01M 2/1077; H01M 2/206; H01M 10/625; H01M 10/6557; H01M 10/643; H01M 2220/20
See application file for complete search history.

(56) References Cited

U.S. PATENT DOCUMENTS

| | | | |
|---|---|---|---|
| 2011/0151315 A1* | 6/2011 | Masson | H01M 2/1077 429/159 |
| 2011/0258845 A1* | 10/2011 | Wells | H01M 2/1005 29/623.1 |
| 2011/0293998 A1 | 12/2011 | Bunya et al. | |

(Continued)

FOREIGN PATENT DOCUMENTS

CN    205 828 469 U    12/2016

OTHER PUBLICATIONS

Office Action and Search Report for EP Application No. 17189784 dated Nov. 7, 2017, 8 pages.

*Primary Examiner* — Jane J Rhee
(74) *Attorney, Agent, or Firm* — Kilpatrick Townsend & Stockton LLP (57) ABSTRACT

A rechargeable battery system, a battery pack, methods of manufacturing the same, and an electric vehicle are disclosed herein. The battery pack includes an upper tray, a first busbar attached to the upper tray, a lower tray, a second busbar attached to the lower tray, and a plurality of battery cells arranged in the upper and lower trays. The rigidity of the combination of the upper tray and the first busbar is provided predominantly by the first busbar.

16 Claims, 7 Drawing Sheets

(56) References Cited

U.S. PATENT DOCUMENTS

| | | |
|---|---|---|
| 2014/0154541 A1 | 6/2014 | Kazuma et al. |
| 2015/0104689 A1* | 4/2015 | Frias .................... H01M 2/204 429/121 |
| 2015/0179995 A1 | 6/2015 | Yoshiki et al. |
| 2016/0093864 A1 | 3/2016 | Yoshiki et al. |

* cited by examiner

BATTERY SYSTEM HOUSING WITH BUSBAR GRID FIXATION

CROSS-REFERENCE TO RELATED APPLICATION

This application is a nonprovisional of and claims priority to U.S. Provisional Application No. 62/384,298, filed Sep. 7, 2016, the entire contents of which are hereby incorporated by reference for all purposes.

BACKGROUND

An electric vehicle uses one or more electric motors powered by electrical energy stored in a rechargeable battery system. Lithium-based batteries are often chosen for their high power and energy density. In order to ensure that an electric vehicle operates efficiently and safely, the battery system must be small and have sufficient mechanical strength.

As the popularity of electric vehicles increases, efficiency in the manufacturing process will become more important. Processes and devices that decrease the cost of manufacturing battery systems while simultaneously increasing their reliability and safety will be key to meeting customer demands. Specifically, there is a need for processes and devices that ensure reliable electrical connections between individual battery cells, that efficiently cool the battery system, and that aid in the manufacturing process of assembling the thousands of individual battery cells into modular systems that can be installed and replaced when necessary.

BRIEF SUMMARY OF THE INVENTION

Aspects of the present disclosure relate to battery systems and methods of making and/or manufacturing the battery systems, and some aspects of the present disclosure relate to busbars and specifically to busbars which provide mechanical support to the battery systems.

One aspect of the present disclosure relates to a battery system for an electric vehicle. The battery system includes one or more battery packs or modules having a plurality of battery cells arranged into one or more rows. In some embodiments: each of the plurality of battery cells includes a first terminal and a second terminal; and the plurality of battery cells includes a subset of battery cells with the first terminal oriented in a same direction in each battery pack. The battery packs include one or more busbars that can conduct electrical energy to and from at least the subset of battery cells. The busbars can include a plurality of contacts positioned over the first terminals of the subset of battery cells. In some embodiments, the busbars additionally provide mechanical support for the battery packs.

One inventive aspect is a battery pack for an electric vehicle. The battery pack includes an upper tray, a first busbar attached to the upper tray, a lower tray, a second busbar attached to the lower tray, and a plurality of battery cells arranged in the upper and lower trays. The rigidity of the combination of the upper tray and the first busbar is provided predominantly by the first busbar.

In some embodiments, the rigidity of the combination of the lower tray and the second busbar is provided predominantly by the second busbar.

In some embodiments, the battery pack also includes a second busbar attached to the upper tray, where the rigidity of the combination of the upper tray and the first and second busbars is provided predominantly by the first and second busbars.

In some embodiments, the upper tray is formed of a plastic having a thickness less than 4 mm.

In some embodiments, the lower tray is formed of a plastic having a thickness less than 4 mm.

In some embodiments, the first busbar is formed of a conductive material having a thickness less than 2 mm.

In some embodiments, the second busbar is formed of a conductive material having a thickness less than 2 mm.

In some embodiments, the upper tray includes one or more indentations configured to receive and to hold in place the battery cells.

In some embodiments, the lower tray includes one or more indentations configured to receive and to hold in place the battery cells.

Another inventive aspect is a method of manufacturing a battery pack for an electric vehicle. The method includes attaching a busbar to an upper tray, attaching first sides of a plurality of battery cells to the upper tray, and attaching second sides of the battery cells to the upper tray. The rigidity of the combination of the upper tray and the first busbar is provided predominantly by the first busbar.

In some embodiments, the rigidity of the combination of the lower tray and the second busbar is provided predominantly by the second busbar.

In some embodiments, the method also includes attaching a second busbar attached to the upper tray, where the rigidity of the combination of the upper tray and the first and second busbars is provided predominantly by the first and second busbars.

In some embodiments, the upper tray is formed of a plastic having a thickness less than 4 mm.

In some embodiments, the lower tray is formed of a plastic having a thickness less than 4 mm.

In some embodiments, attaching the first sides of the battery cells to the upper tray includes placing the battery cells into one or more indentations in the upper tray, where the indentations are configured to receive and to hold in place the battery cells.

In some embodiments, attaching the second sides of the battery cells to the lower tray includes placing the battery cells into one or more indentations in the lower tray, where the indentations are configured to receive and to hold in place the battery cells.

Another inventive aspect is an electric vehicle powered by a battery pack. The battery pack includes an upper tray, a first busbar attached to the upper tray, a lower tray, a second busbar attached to the lower tray, and a plurality of battery cells arranged in the upper and lower trays. The rigidity of the combination of the upper tray and the first busbar is provided predominantly by the first busbar.

In some embodiments, the battery pack of the electric vehicle also includes a second busbar attached to the upper tray, where the rigidity of the combination of the upper tray and the first and second busbars is provided predominantly by the first and second busbars.

In some embodiments, the upper tray is formed of a plastic having a thickness less than 4 mm.

In some embodiments, the upper tray includes one or more indentations configured to receive and to hold in place the battery cells.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Described herein are embodiments for providing a battery system for an electric vehicle. The battery system includes one or more battery packs or modules having a plurality of battery cells arranged into one or more rows. In some embodiments, each of the plurality of battery cells includes a first terminal and a second terminal, and the battery cells includes a subset of battery cells with the first terminal oriented in a same direction in each battery pack. The battery packs include one or more busbars that can conduct electrical energy to and from at least the subset of battery cells. The busbars can include a plurality of contacts positioned over the first terminals of the subset of battery cells. In some embodiments, the busbars additionally provide mechanical support for the battery packs.

In some embodiments, the busbar cooling duct can be fluidly connect to a cooling system that can include, for example, a heat exchanger. In some embodiments, the cooling system and/or the heat exchanger can be a part of the battery pack and/or can be separate from the battery pack.

The busbar cooling duct can comprise a variety of shapes and sizes. In some embodiments, the busbar cooling duct can comprise an elongate channel that can have, a polygonal cross-section, a circular cross-section, a semi-circular cross-section, and/or any other desired shape of cross-section. In some embodiments, the busbar cooling duct can be straight, curved, angled, zig-zag, serpentine, circular, or the like.

Figure 1:
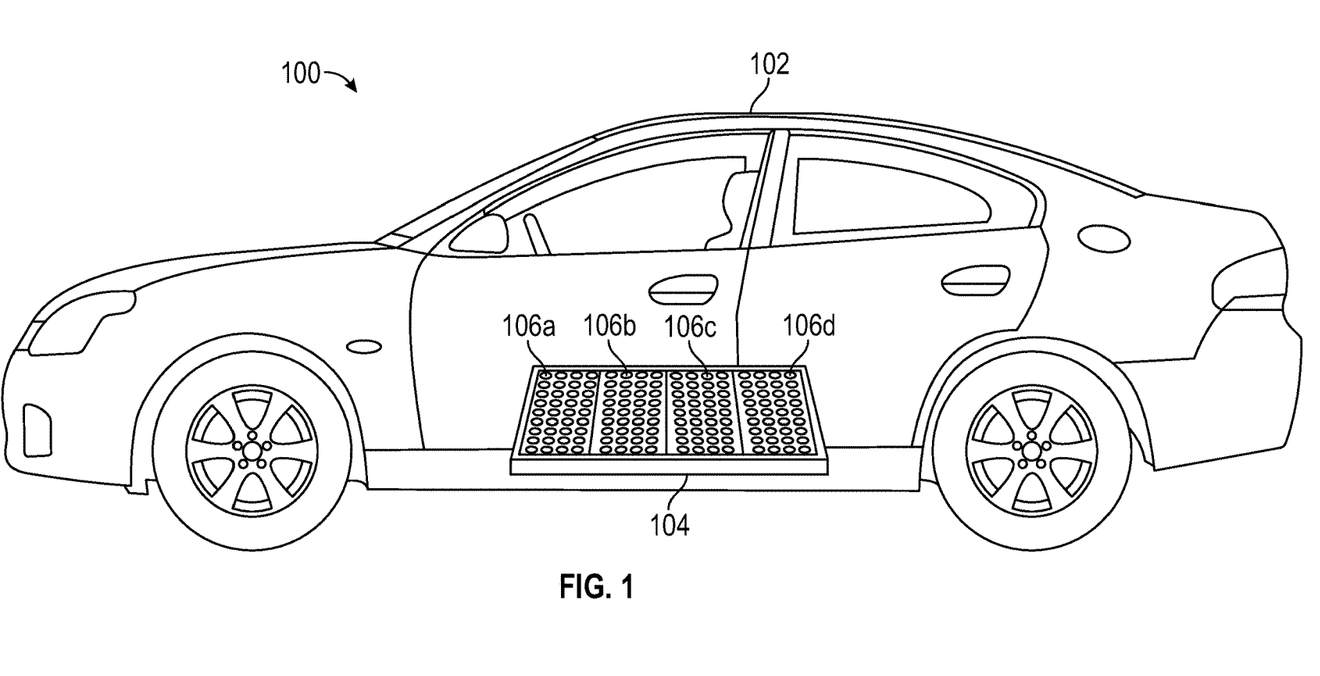
FIG. 1 illustrates a simplified diagram of an electric vehicle with a rechargeable battery system, according to some embodiments.

FIG. 1 illustrates a simplified diagram 100 of an electric vehicle 102 with a rechargeable battery system 104, according to some embodiments. The rechargeable battery system 104 may be comprised of one or more battery modules or packs 106. A battery pack may be comprised of a plurality of individual battery cells that are electrically connected to provide a particular voltage/current to the electric vehicle 102. In some embodiments, the battery cells forming the battery pack can be arranged in one or several rows of battery cells. Depending on the embodiment, the electric vehicle 102 may include hybrid vehicles that operate using both fuel combustion and stored electric power, as well as fully electric vehicles that operate entirely from stored electric power.

The rechargeable battery system 104 represents a major component of the electric vehicle 102 in terms of size, weight, and cost. A great deal of effort goes into the design and shape of the rechargeable battery system 104 in order to minimize the amount of space used in the electric vehicle 102 while ensuring the safety of its passengers. In some electric vehicles, the rechargeable battery system 104 is located under the floor of the passenger compartment as depicted in FIG. 1. In other electric vehicles, the rechargeable battery system 104 can be located in the trunk or in the hood areas of the electric vehicle.

While a smaller number of larger battery cells could be more energy-efficient, the size and cost of these larger batteries are prohibitive. Furthermore, larger batteries require more contiguous blocks of space in the electric vehicle 102. This prevents larger batteries from being stored in locations such as the floor of the passenger compartment as depicted in FIG. 1. Therefore, some embodiments use a large number of smaller battery cells that are coupled together to generate electrical characteristics that are equivalent to single larger cells. The smaller cells may be, for example, the size of traditional AA/AAA batteries, and may be grouped together to form a plurality of battery packs 106. Each battery pack may include a large number of individual battery cells. In one embodiment, 700 individual lithium-ion batteries are joined together to form each of a number of single battery packs 106a, 106b, 106c, and 106d, and the rechargeable battery system 104 may include the four battery packs 106a, 106b, 106c, and 106d. In some embodiments, the rechargeable battery system 104 include eight battery packs, ten battery packs, sixteen battery packs, or another number of battery packs, connected in parallel or series until the electrical requirements of the electric vehicle 102 are satisfied. The individual battery cells included in each battery pack 106 may total in the thousands for a single electric vehicle 102.

Figure 2:
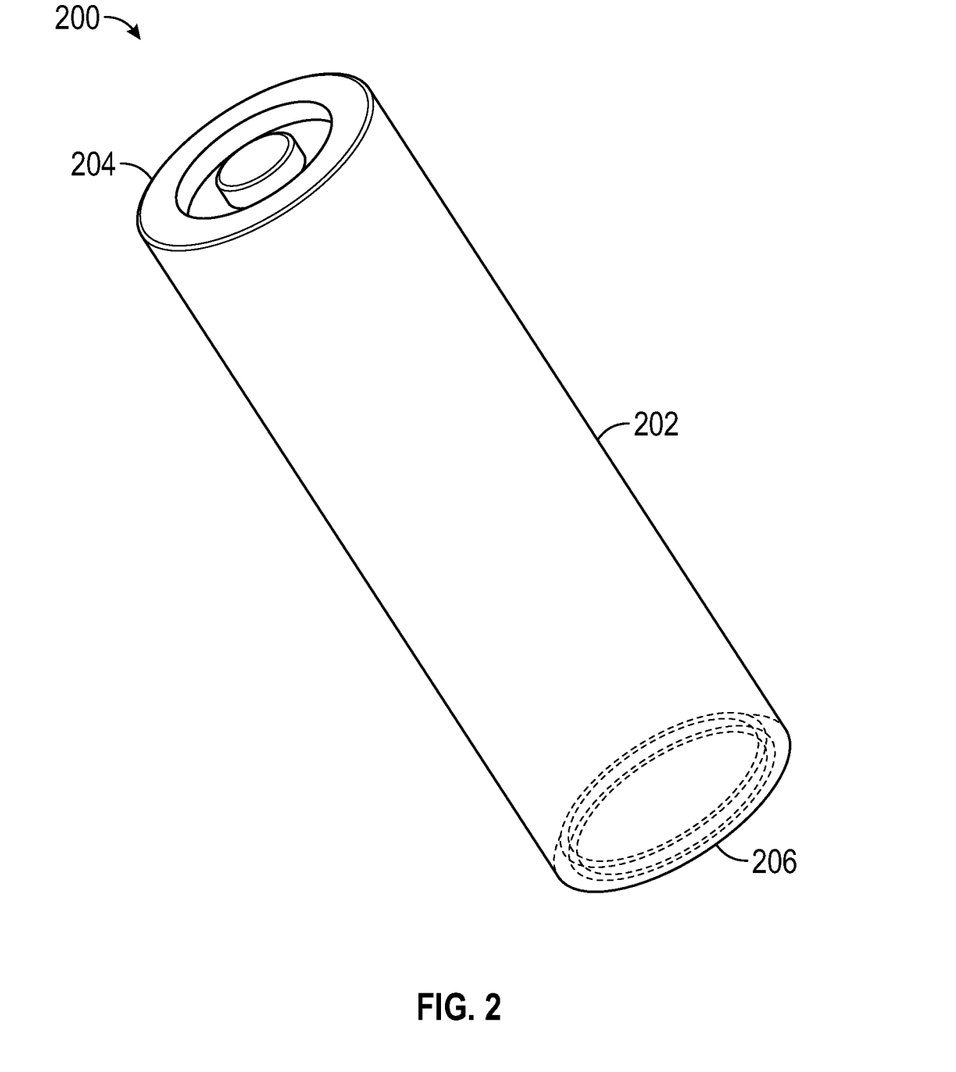
FIG. 2 illustrates a lithium-based battery that may be used in electric vehicles, according to some embodiments.

FIG. 2 illustrates a diagram 200 of a lithium-based battery 202 that may be used in electric vehicles, according to some embodiments. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic®, or some variation on the 18650 form-factor of 6.5 cm×1.8 cm and approximately 45 g. The battery 202 may have at least two terminals. In some embodiments, a positive terminal 204 may be located at the top of the battery 202, and a negative terminal 206 may be located on the opposite bottom side of the battery 202.

In some embodiments, some or all of the battery cells forming a battery pack 106 can be oriented in the same direction. In other words, the positive terminal of each of the individual battery cells faces in an upward direction relative to the battery pack, and each of the negative terminals faces in a downward direction. In other embodiments, this need not be the case. Alternating rows of individual battery cells may be oriented in opposite direction such that the positive terminal of a first row is oriented in the up direction and the positive terminal of a second row is oriented in the downward direction. The orientation pattern for individual battery cells may vary without limitation. For example, every other battery cell in a row be oriented in opposite directions. In some embodiments, one half of the battery pack may have battery cells oriented in one direction, while the other half of the battery pack has cells oriented in the opposite direction. In any of these cases, connections may need to be established between batteries oriented in opposite directions or between batteries oriented in the same direction.

In order to make electrical connections between battery cells, a busbar may be used. As used herein, the term "busbar" refers to any metallic conductor that is connected to a plurality of individual battery cell terminals in order to transmit power from the individual battery cells to the electrical system of the electric vehicle. In some embodiments, the busbar may comprise a flat metallic sheet that is positioned on the top or the bottom of the battery pack. In some embodiments, the metallic sheet may cover an entire top or bottom of the battery pack, while in other embodiments, the busbar may comprise a strip that is longer than it is wide to interface with a single row of battery cells.

Figure 3:
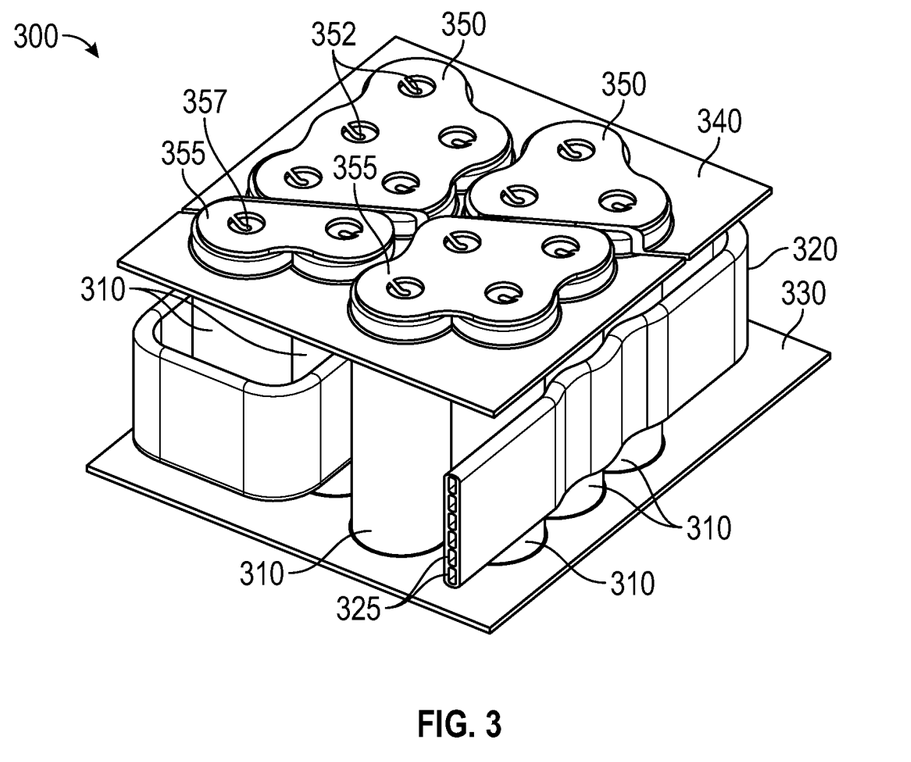
FIG. 3 is an illustration of a battery pack.

FIG. 3 is an illustration of battery pack 300, which includes battery cells 310, cooling duct 320, lower tray 330, upper tray 340, busbar 350, and busbar 355. Battery pack 300 also includes one or more busbars not shown connected to the underside of lower tray 330. In alternative embodiments, other numbers of battery cells are used. For example, in some embodiments, a battery pack includes 700 or another number of battery cells.

As shown, battery cells 310 are arranged so as to engage indentations in lower tray 330 and upper tray 340. Because of the indentations, lower tray 330 and upper tray 340 provide mechanical support which resists lateral or shearing forces. In some embodiments, lower tray 330 and upper tray 340 are nonconductive. For example lower tray 330 and upper tray 340 may be formed with an injection molded plastic.

In addition, battery cells 310 are arranged so as to be supported by cooling duct 320. Cooling duct 320 also provides mechanical support resisting lateral or shearing forces. In addition, cooling duct 320 provides mechanical support to the battery cells during manufacturing, as discussed further below. Cooling duct 320 may also include fluid channels 325, through which a cooling fluid may be circulated so as to provide a path through which heat may be removed from the battery cells 310.

Busbars 350 and 355 are mechanically connected with upper tray 340. For example, the busbars 350 and 355 may be glued or welded to upper tray 340. Busbars 350 and 355 are conductive and provide electrical connections to the battery cells 310.

Busbars 350 and 355 also provide mechanical support which resists flexing forces experienced by upper tray 340. Because of the rigidity of busbars 350 and 355, upper tray 340 may be thin. For example, the plastic of the upper tray 340 may be between about 2 mm and about 4 mm thick. In addition, busbars 350 and 355 may be between about 1 mm and about 2 mm thick. Accordingly, the combination of the plastic of the upper tray 340 and the busbars 350 and 355 may be between about 3 mm and 6 mm thick. In the combination, the rigidity of the combination is provided predominantly by the busbars 350 and 355. As a result, the upper tray 340 may be thin so that the height of the battery pack 300 may be beneficially less than it would be if the upper tray 340 were thicker.

In this embodiment, busbar 350 also includes a plurality of contacts 352. The plurality of contacts 352 are configured to electrically connect one or several portions and/or layers of the busbar 350 with one or several battery cells 310, and specifically to the terminals of one or several battery cells 310. In some embodiments, one or several of the plurality of contacts 352 can be electrically connected with one or several conductive layers of the busbar 350 and/or with one or several conductive materials forming the busbar 350.

In this embodiment, busbar 355 also includes a plurality of contacts 357. The plurality of contacts 357 are configured to electrically connect one or several portions and/or layers of the busbar 355 with one or several battery cells 310, and specifically to the terminals of one or several battery cells 310. In some embodiments, one or several of the plurality of contacts 352 can be electrically connected with one or several conductive layers of the busbar 355 and/or with one or several conductive materials forming the busbar 355.

The battery cells 310 may be oriented such that busbar 350 provides an electrical connection with battery cell terminals of a first polarity and busbar 355 provides an electrical connection with battery cell terminals of a second polarity. For example, busbar 350 may provide an electrical connection with positive battery cell terminals, and busbar 355 may provide an electrical connection with negative battery terminals. Alternatively, busbar 350 may provide electrical connection with negative battery terminals, and busbar 355 may provide electrical connection with positive battery terminals.

FIGS. 4A-4H is a series of views illustrating a process of manufacturing a battery pack, such as battery pack 300 of FIG. 3.

Figure 4A:
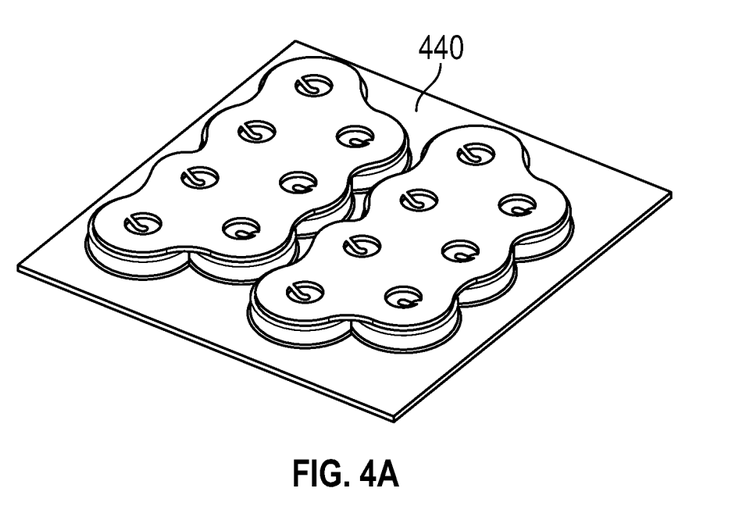
FIGS. 4A-4H is a series of views illustrating a process of manufacturing a battery pack.

FIG. 4A is an illustration view of an upper tray 440. Upper tray 440 may, for example, be formed with an injection molded plastic, or another nonconductive material. In some embodiments, the material forming upper tray 440 may, for example, be between about 2 mm and about 4 mm thick.

Figure 4B:
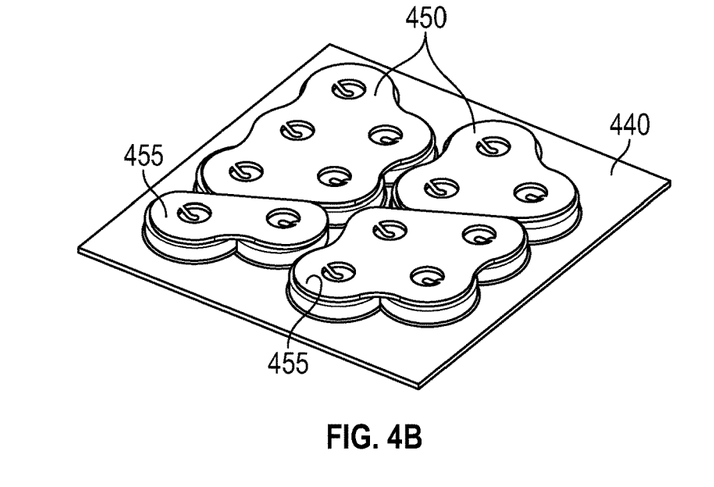

FIG. 4B is an illustration of upper tray 440 having busbars 450 and 455 attached thereto. Busbars 450 and 455 may comprise a conductive metal, and may be fixed to upper tray 440 with an adhesive material, a glue, an epoxy, or with another mechanism, such as a weld. In some embodiments, busbars 450 and 455 are attached to upper tray 440 through a heating process, which melts or partially melts the material of upper tray 440 such that once frozen, the material of upper tray 440 is fixed to busbars 450 and 455.

Once the busbars 450 and 455 are fixed to upper tray 440, the rigidity and/or resistance to flexing of the combination of upper tray 440 and busbars 450 and 455 is mostly a result of the busbars 450 and 455. Accordingly, without substantially sacrificing rigidity, the upper tray 440 may be thin so that the height of the battery pack may be beneficially less than it would be if the upper tray 440 were thicker.

Figure 4C:
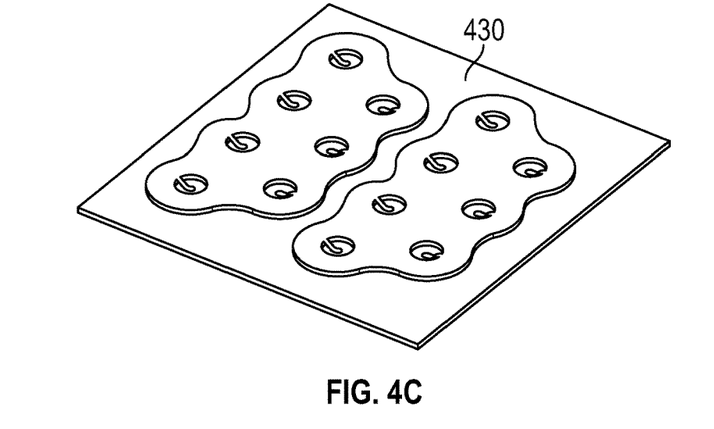

FIG. 4C is an illustration of a lower tray 430. Lower tray 430 may, for example, be formed with an injection molded plastic, or another nonconductive material. In some embodiments, the material forming upper tray 430 may, for example, be between about 2 mm and about 4 mm thick.

Figure 4D:
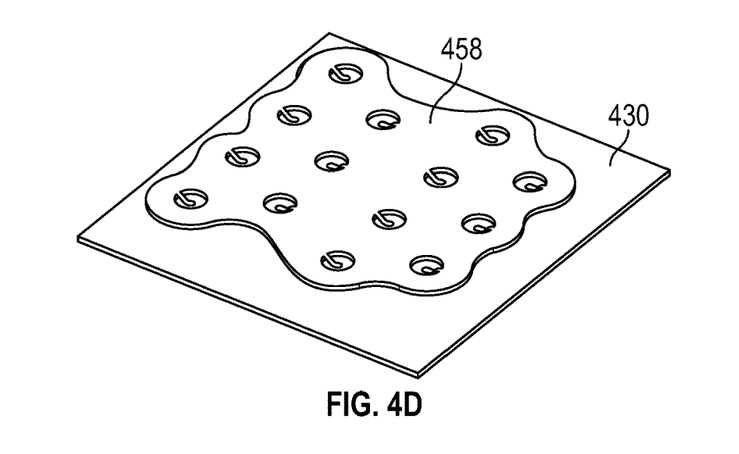

FIG. 4D is an illustration of lower tray 430 having busbar 458 attached thereto. The busbar 458 may comprise a conductive metal, and may be fixed to lower tray 430 with an adhesive material, a glue, an epoxy, or with another mechanism, such as a weld. In some embodiments, busbar 458 is attached to lower tray 430 through a heating process, which melts or partially melts the material of lower tray 430 such that once frozen, the material of lower tray 430 is fixed to busbar 458.

Once the busbar 458 is fixed to lower tray 430, the rigidity and/or resistance to flexing of the combination of lower tray 430 and busbar 458 is mostly a result of the mechanical properties of the busbar 458. Accordingly, without substantially sacrificing rigidity, the lower tray 430 may be thin so that the height of the battery pack may be beneficially less than it would be if the lower tray 430 were thicker.

Figure 4E:
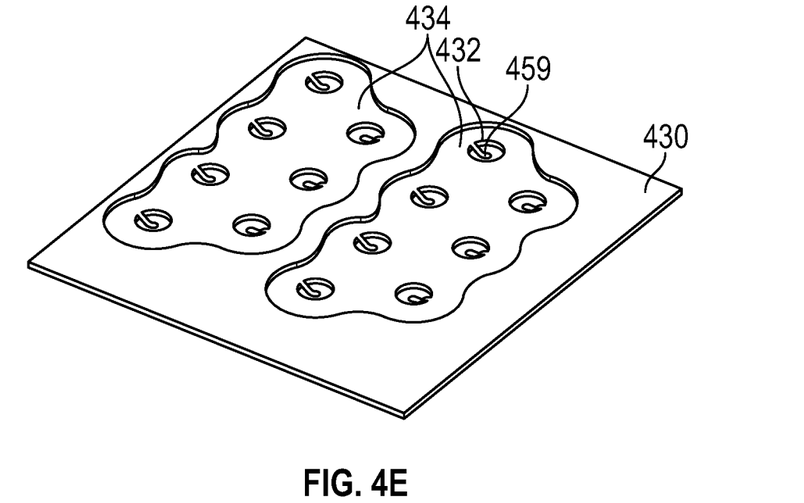

FIG. 4E is an illustration of lower tray 430 having busbar 458 attached thereto. Busbar 458 is on the opposite side of lower tray 430 shown. Contacts 459 of busbar 458 are visible through the holes 432 of lower tray 430.

As illustrated, lower tray 430 includes indentations 434 having shapes which correspond with an outline of a plurality of battery cells. In this embodiment, indentations 434 are configured to receive seven battery cells.

Figure 4F:
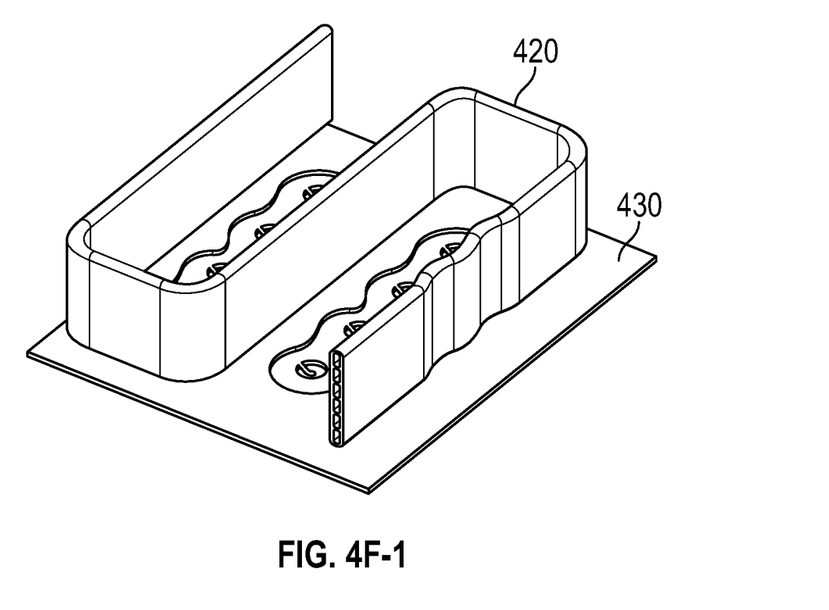

FIG. 4F-1 is an illustration of lower tray 430 and cooling duct 420. In some embodiments of the method of manufacturing, cooling duct 420 is attached to lower tray 430 or is held in proximity to lower tray 430 so as to be configured to receive and support the battery cells as they are placed in the indentations 434.

Figure 4F:
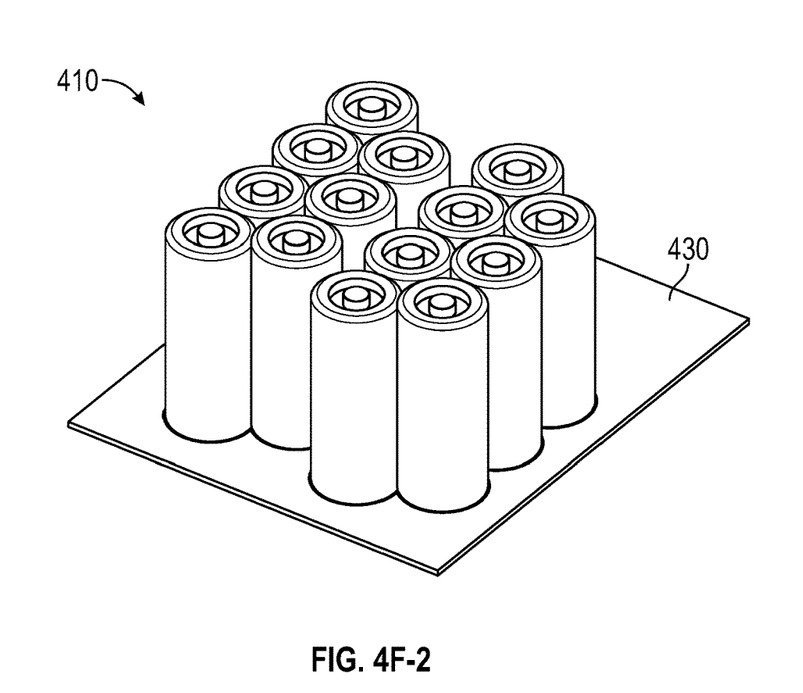

FIG. 4F-2 is an illustration of lower tray 430 and battery cells 410. In some embodiments of the method of manufacturing, battery cells 410 are placed in the indentations 434 of lower tray 430 prior to being supported by cooling duct 420. Battery cells 410 are placed in lower tray 430 so that the terminals of battery cells 410 near lower tray 430 electrically connect with contacts 459 of busbar 458, and so that the battery cells 410 engage and are held in place by the indentations 434 of lower tray 430. In some embodiments, the battery cells 410 are fixed to lower tray 430 with, for example, a glue or another fixing mechanism.

Figure 4G:
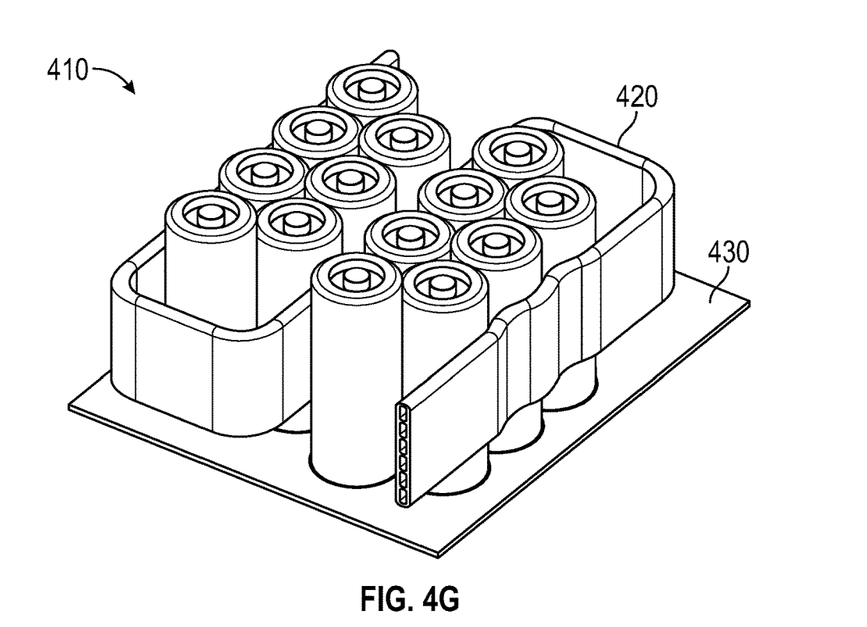

FIG. 4G is an illustration of lower tray 430, battery cells 410, and cooling duct 420. Battery cells 410 engage and are held in place by the indentations 434 of lower tray 430, and cooling duct 420 provides additional mechanical support to the battery cells 410 during manufacturing, such that the battery cells 410 are less likely to be removed from lower tray 430 by, for example, lateral or other forces.

Figure 4H:
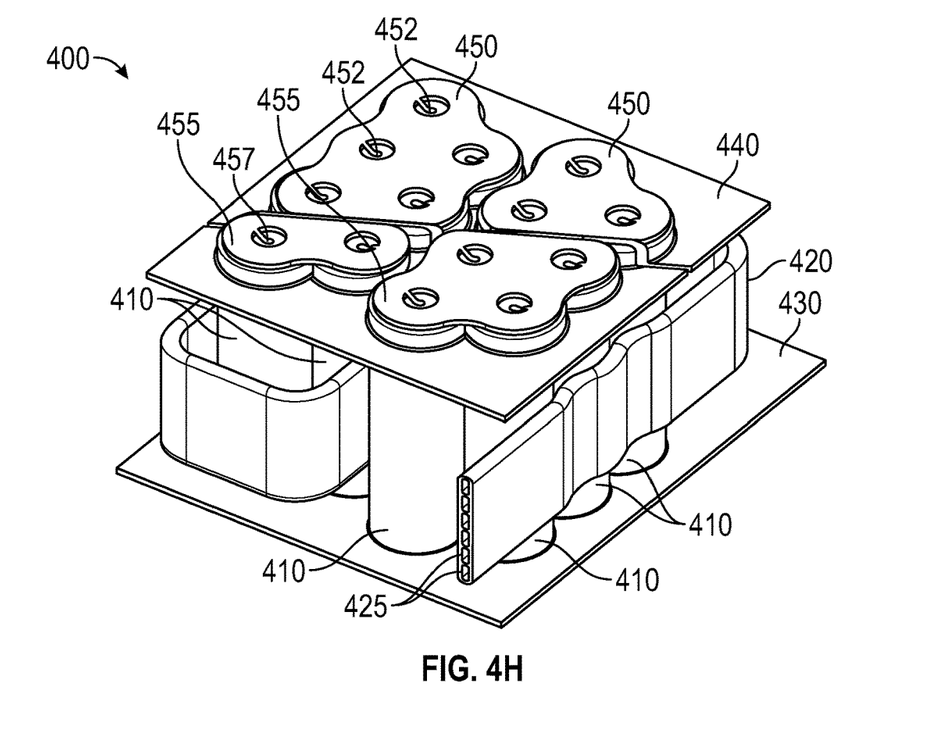

FIG. 4H is an illustration of the manufactured battery pack 400. As shown, upper tray 440 having busbars 450 and 455 attached thereto, has been attached to battery cells 410 such that the battery cells 410 engage and are held in place by the indentations of upper tray 440, and the terminals of battery cells 410 near upper tray 440 engage and form electrical connections with the contacts 452 of busbar 450 and engage and form electrical connections with the contacts 457 of busbar 455. In some embodiments, the battery cells 410 are fixed to upper tray 440 with, for example, a glue or another fixing mechanism.

Figure 5:
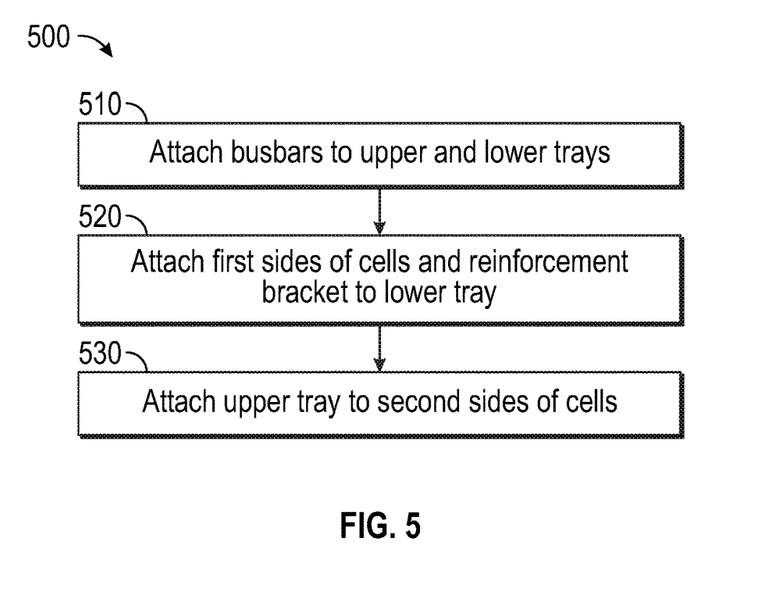
FIG. 5 is a flowchart illustrating one embodiment of a process for manufacturing a rechargeable battery pack.

FIG. 5 is a flowchart illustrating one embodiment of a process 500 for manufacturing a rechargeable battery pack, such as those discussed herein. The method can include, for example, a process for manufacturing one or several battery packs 106 of rechargeable battery pack system 104, discussed above with reference to FIG. 1.

The process begins at block 510, and may include attaching one or more busbars to a lower tray. The lower tray may be, for example, formed of a nonconductive plastic material, and may have indentations configured to receive battery cells. The one or more busbars may be attached to the lower tray on a side opposite the indentations. The one or more busbars may be attached to the lower tray using a glue or another fixing mechanism.

At 510, the process may additionally or alternatively include attaching one or more busbars to an upper tray. The upper tray may be, for example, formed of a nonconductive plastic material, and may have indentations configured to receive battery cells. The one or more busbars may be attached to the upper tray on a side opposite the indentations. The one or more busbars may be attached to the upper tray using a glue or another fixing mechanism.

The process 500 may also include attaching battery cells to the lower tray as shown in block 520. In some embodiments, the battery cells are fixed to the lower tray with, for example, a glue or another fixing mechanism. The battery cells are attached to the lower tray such that the battery cells engage and are held in place by the indentations of the lower tray. In addition, the battery cells are attached to the lower tray such that the terminals of the battery cells near the lower tray form an electrical connection with the contacts of the busbars attached to the lower tray.

The process 500 may also include attaching battery cells to the upper tray as shown in block 530. In some embodiments, the battery cells are fixed to the upper tray with, for example, a glue or another fixing mechanism. The battery cells are attached to the upper tray such that the battery cells engage and are held in place by the indentations of the upper tray. In addition, the battery cells are attached to the upper tray such that the terminals of the battery cells near the upper tray form an electrical connection with the contacts of the busbars attached to the upper tray.

In alternative embodiments, the battery cells are fixed to the busbars, for example, with a glue, or another attachment mechanism, such as a weld. In such embodiments, the battery cells may additionally be attached to the upper tray and/or lower tray by a glue or another attachment mechanism. In some embodiments, the battery cells are held against the upper tray and/or lower tray by the attachment mechanism attaching the battery cells to the upper tray and/or lower tray, and are not otherwise attached to the upper tray and/or lower tray.

The process 500 may additionally include electrically connecting the rechargeable battery system with a motor configured to provide power to the vehicle.

It should be appreciated that the specific steps illustrated in FIG. 5 provide particular methods of providing a rechargeable battery system and/or a battery pack for an electric vehicle according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A battery pack for an electric vehicle, the battery pack comprising:
   an upper tray;
   a first busbar attached to the upper tray;
   a lower tray;
   a second busbar attached to the lower tray; and
   a plurality of battery cells arranged in the upper and lower trays,
   wherein the rigidity of the upper tray is less than the rigidity of the first busbar, such that the rigidity of the combination of the upper tray and the first busbar is provided predominantly by the first busbar,
   wherein the upper tray is between about 2 mm and about 4mm thick, and
   wherein the first busbar is between about 1 mm and about 2 mm thick.

2. The battery pack of claim 1, wherein the rigidity of the combination of the lower tray and the second busbar is provided predominantly by the second busbar.

3. The battery pack of claim 1, further comprising a second busbar attached to the upper tray, wherein the rigidity of the combination of the upper tray and the first and second busbars is provided predominantly by the first and second busbars.

4. The battery pack of claim 1, wherein the lower tray is formed of a plastic having a thickness less than 4 mm.

5. The battery pack of claim 1, wherein the second busbar is formed of a conductive material having a thickness less than 2 mm.

6. The battery pack of claim 1, wherein the upper tray comprises one or more indentations configured to receive and to hold in place the battery cells.

7. The battery pack of claim 1, wherein the lower tray comprises one or more indentations configured to receive and to hold in place the battery cells.

8. A method of manufacturing a battery pack for an electric vehicle, the method comprising:
   attaching a busbar to an upper tray;
   attaching first sides of a plurality of battery cells to the upper tray; and
   attaching second sides of the battery cells to the upper tray,
   wherein the rigidity of the upper tray is less than the rigidity of the first busbar, such that the rigidity of the combination of the upper tray and the first busbar is provided predominantly by the first busbar,
   wherein the upper tray is between about 2 mm and about 4 mm thick, and
   wherein the first busbar is between about 1 mm and about 2 mm thick.

9. The method claim 8, wherein the rigidity of the combination of the lower tray and the second busbar is provided predominantly by the second busbar.

10. The method claim 8, further comprising attaching a second busbar attached to the upper tray, wherein the rigidity of the combination of the upper tray and the first and second busbars is provided predominantly by the first and second busbars.

11. The method claim 8, wherein the lower tray is formed of a plastic having a thickness less than 4 mm.

12. The method claim 8, wherein attaching the first sides of the battery cells to the upper tray comprises placing the battery cells into one or more indentations in the upper tray, wherein the indentations are configured to receive and to hold in place the battery cells.

13. The method claim 8, wherein attaching the second sides of the battery cells to the lower tray comprises placing the battery cells into one or more indentations in the lower tray, wherein the indentations are configured to receive and to hold in place the battery cells.

14. An electric vehicle powered by a battery pack, the battery pack comprising:
   an upper tray;
   a first busbar attached to the upper tray;
   a lower tray;
   a second busbar attached to the lower tray; and
   a plurality of battery cells arranged in the upper and lower trays,
   wherein the rigidity of the upper tray is less than the rigidity of the first busbar, such that the rigidity of the combination of the upper tray and the first busbar is provided predominantly by the first busbar,
   wherein the upper tray is between about 2 mm and about 4 mm thick, and
   wherein the first busbar is between about 1 mm and about 2 mm thick.

15. The electric vehicle of claim 14, further comprising a second busbar attached to the upper tray, wherein the rigidity of the combination of the upper tray and the first and second busbars is provided predominantly by the first and second busbars.

16. The electric vehicle of claim 14, wherein the upper tray comprises one or more indentations configured to receive and to hold in place the battery cells.

* * * * *